United States Patent
Porter et al.

(10) Patent No.: US 9,366,404 B1
(45) Date of Patent: Jun. 14, 2016

(54) DECORATIVE LIGHTING SYSTEM FOR SPORTING EQUIPMENT

(71) Applicants: Dakota W. Porter, Traverse City, MI (US); Garret W. Porter, Traverse City, MI (US)

(72) Inventors: Dakota W. Porter, Traverse City, MI (US); Garret W. Porter, Traverse City, MI (US)

(73) Assignee: 45TH PARALLEL LIGHTING, LLC, Traverse City, MI (US)

( * ) Notice: Subject to any disclaimer, the term of this patent is extended or adjusted under 35 U.S.C. 154(b) by 27 days.

(21) Appl. No.: 14/287,525

(22) Filed: May 27, 2014

Related U.S. Application Data

(60) Provisional application No. 61/827,845, filed on May 28, 2013.

(51) Int. Cl.

| | |
|---|---|
| F21L 4/00 | (2006.01) |
| F21S 8/10 | (2006.01) |
| F21L 4/02 | (2006.01) |
| F21V 31/00 | (2006.01) |
| F21K 99/00 | (2016.01) |
| A63C 11/00 | (2006.01) |
| A63C 13/00 | (2006.01) |
| A43B 5/04 | (2006.01) |
| A63C 17/26 | (2006.01) |

(52) U.S. Cl.
CPC ............... *F21S 48/00* (2013.01); *A43B 5/0415* (2013.01); *A63C 11/00* (2013.01); *A63C 13/00* (2013.01); *A63C 17/26* (2013.01); *F21K 9/30* (2013.01); *F21L 4/02* (2013.01); *F21V 31/00* (2013.01)

(58) Field of Classification Search
CPC ............ F21S 48/00; F21L 4/02; F21V 31/00; F21K 9/30; A63C 11/00; A63C 13/00; A63C 17/26; A43B 5/0415
See application file for complete search history.

(56) References Cited

U.S. PATENT DOCUMENTS

| | | | | |
|---|---|---|---|---|
| 4,521,835 A | * | 6/1985 | Meggs | F21S 4/005 362/184 |
| 5,552,971 A | | 9/1996 | Madden | |
| 6,802,636 B1 | * | 10/2004 | Bailey, Jr. | A63C 17/01 280/841 |
| 7,708,289 B2 | | 5/2010 | Jaime, Sr. | |
| 8,038,313 B1 | | 10/2011 | Campbell | |
| 8,052,293 B2 | | 11/2011 | Hurwitz | |
| 8,083,238 B2 | | 12/2011 | Borges | |
| 2009/0067187 A1 | * | 3/2009 | Jaime, Sr. | A63C 17/26 362/544 |
| 2009/0236811 A1 | | 9/2009 | Lewis | |
| 2011/0211363 A1 | * | 9/2011 | Hurwitz | A63C 17/01 362/545 |
| 2012/0013094 A1 | | 1/2012 | Golden-Justice | |
| 2012/0216397 A1 | | 8/2012 | Foster | |
| 2012/0275177 A1 | | 11/2012 | Edmisten | |
| 2012/0320614 A1 | | 12/2012 | Malone | |

FOREIGN PATENT DOCUMENTS

WO    WO 03/026358    3/2003

* cited by examiner

*Primary Examiner* — Sharon Payne
(74) *Attorney, Agent, or Firm* — Gardner, Linn, Burkhart & Flory, LLP

(57) ABSTRACT

A decorative lighting system for sporting equipment includes at least one strip of electrical lights, such as LED lamps, which are connected to an electrical power source via wiring, and which are attached to an article of sporting equipment such as a snowboard, snow skis, snowshoes, a skateboard, a bicycle, or the like. The decorative lighting system may be substantially waterproof, and may provide both an attractive appearance when the sporting equipment is used in low-light conditions, while making the sporting equipment more visible in darkness.

20 Claims, 11 Drawing Sheets

DECORATIVE LIGHTING SYSTEM FOR SPORTING EQUIPMENT

CROSS REFERENCE TO RELATED APPLICATION

The present application claims the benefit of U.S. provisional application Ser. No. 61/827,845, filed May 28, 2013, which is hereby incorporated by reference in its entirety.

FIELD OF THE INVENTION

The present invention relates generally to decorative electrical lighting systems and, more particularly, to electrical lighting systems to enhance the visibility of sporting equipment and recreational vehicles particularly in low ambient lighting conditions.

BACKGROUND OF THE INVENTION

Decorative lighting systems are typically used to enhance the visibility of objects in darkness or poor lighting conditions, and may be used to create a decorative appearance. In some cases, such lighting systems enhance safety for those using lighted equipment and others around them, and the light emitted by the systems can also improve the user's view of an area surrounding the equipment, or of the equipment itself.

SUMMARY OF THE INVENTION

The present invention provides a decorative lighting system for sporting equipment that may be used at night or in low-light conditions.

According to one form of the present invention, a decorative lighting system for sporting equipment includes a lighting strip, an electrical power source, electrical wiring, and an attachment element for securing the lighting system to the sporting equipment. The lighting strip includes a plurality of electrical lamps that are arranged substantially in-line with one another, and are supplied with electrical power from the power source, via the electrical wiring. The electrical power source has a water resistant housing that includes an attachment portion to facilitate securing the housing to the sporting equipment, or to an article of clothing of a user of the sporting equipment. The attachment element is configured to couple one or both of the lighting strip and the electrical power source to the sporting equipment.

In one aspect, the lighting system further includes a wireless transmitter, and the electrical switch is remotely actuatable via the wireless transmitter.

In another aspect, the attachment portion of the housing forms a loop that defines an opening through which the attachment element can pass. Optionally, the attachment element is an elongate flexible member, such as a strap or a belt.

According to another form of the present invention, a decorative lighting system for a skateboard includes an elongate channel member, a lighting strip disposed in the channel member, a pair of bracket portions, an electrical power source, and electrical wiring extending between the power source and the lighting strip. The elongate channel member has opposite end portions and is configured to extend between front and rear wheel trucks of the skateboard. The elongate channel member is at least partly made of a translucent material. The lighting strip includes a plurality of electrical lamps that are arranged substantially in-line with one another and disposed in the elongate channel member. The bracket portions are disposed at each of the opposite end portions of the elongate channel member, with each bracket portion comprising at least one mounting portion that is configured to be engaged by a respective one of the wheel trucks, or by a threaded mounting bolt associated with the wheel trucks. The electrical power source provides electrical current to the electrical lamps of the lighting strip, and includes a weather-resistant housing.

In one aspect, the weather-resistant housing of the electrical power source forms one of the bracket portions that is coupled to the skateboard at one of the wheel trucks.

In another aspect, the lighting system includes a wireless hand-held transmitter that is in communication with the electrical power source, and is operable to selectively energize the electrical lamps.

Therefore, the decorative lighting system of the present invention provides enhanced visibility and visual appeal for sporting equipment and/or vehicles, particularly in low ambient light conditions. The system may also provide sufficient light to illuminate an area surrounding the sporting equipment, such as to aid a user of the equipment in seeing surfaces and objects in relative darkness. The system is preferably waterproof or water resistant and shock proof or shock resistant, so that it is suitable for use in the outdoors and on equipment that may experience frequent vibration and hard impacts, plus contaminants such as water, snow, ice, dust, sand, oil, or the like may commonly be encountered.

These and other objects, advantages, purposes, and features of the present invention will become apparent upon review of the following specification in conjunction with the drawings.

DESCRIPTION OF THE PREFERRED EMBODIMENTS

Figure 4:
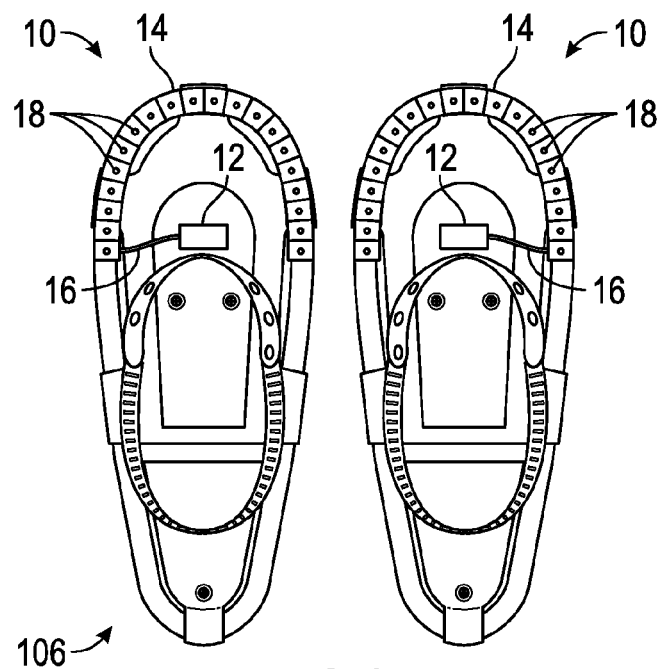
FIG. 4 is a top plan view of a pair of snowshoes incorporating the decorative lighting system.
Figure 5A:
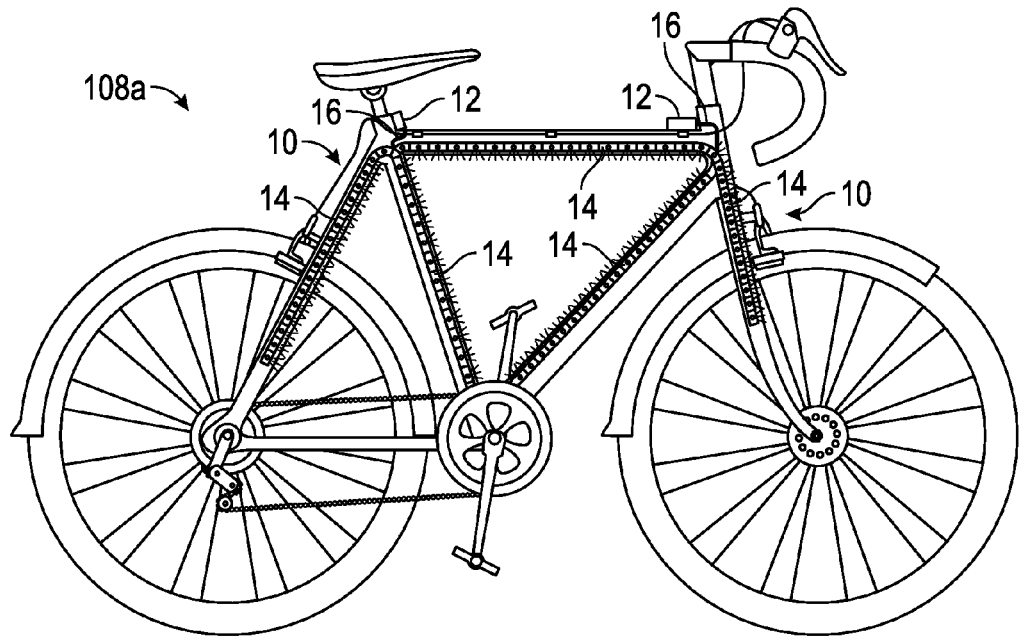
FIG. 5A is a side elevation of a bicycle incorporating the decorative lighting system along its frame and fork.
Figure 5B:
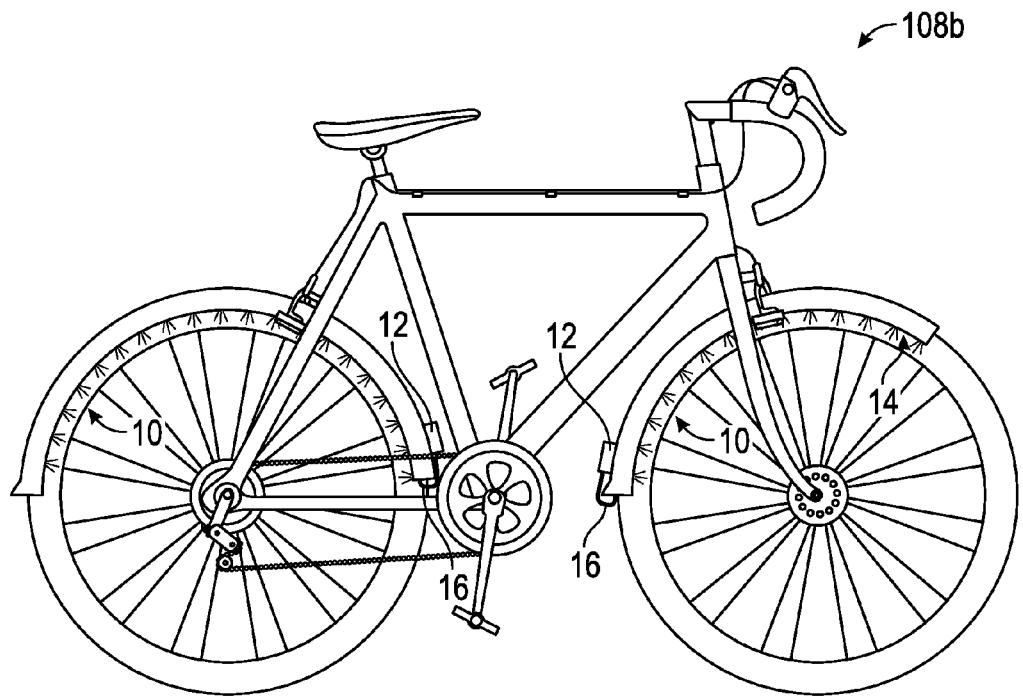
FIG. 5B is a side elevation of another bicycle incorporating the decorative lighting system along interior surfaces of its wheel fenders.
Figure 6:
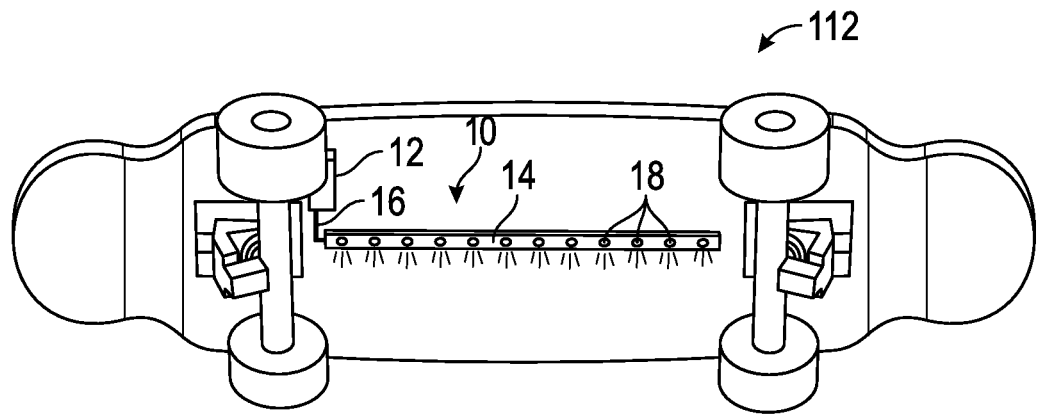
FIG. 6 is a bottom perspective view of a skateboard incorporating a decorative lighting system along its bottom surface.
Figure 13:
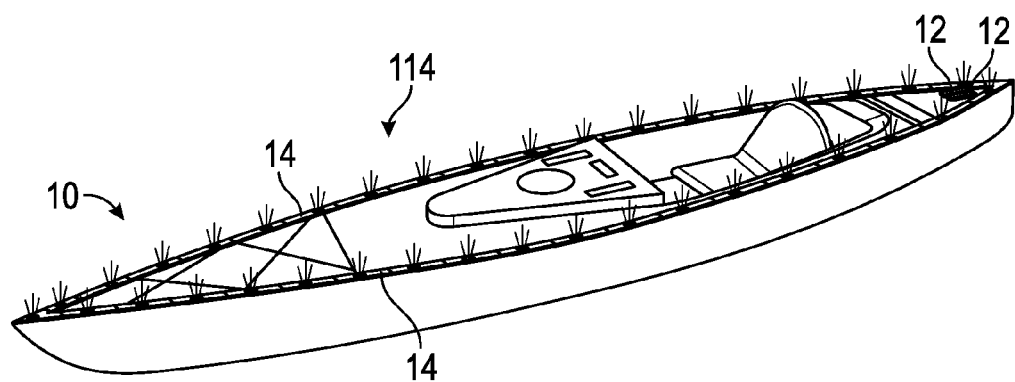
FIG. 13 is a perspective view of a kayak incorporating a decorative lighting system in accordance with the present invention.
Figure 14:
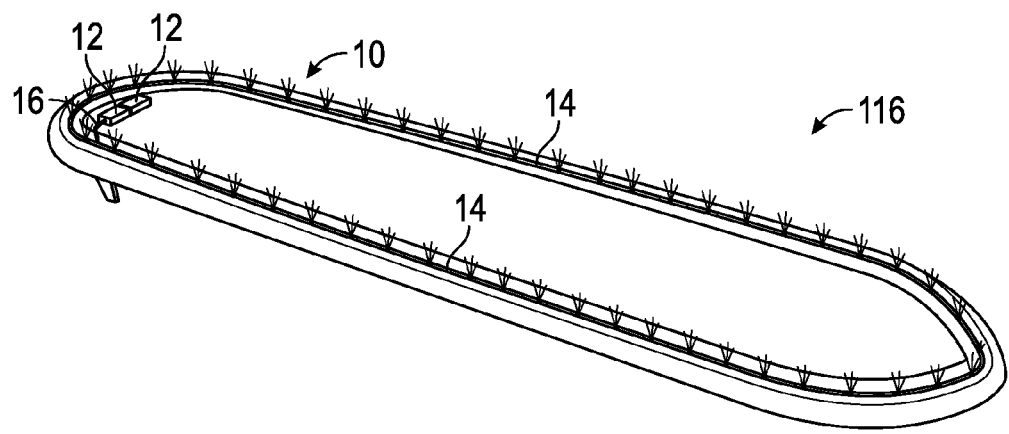
FIG. 14 is a perspective view of a stand-up paddle board incorporating a decorative lighting system in accordance with the present invention.
Figure 15A:
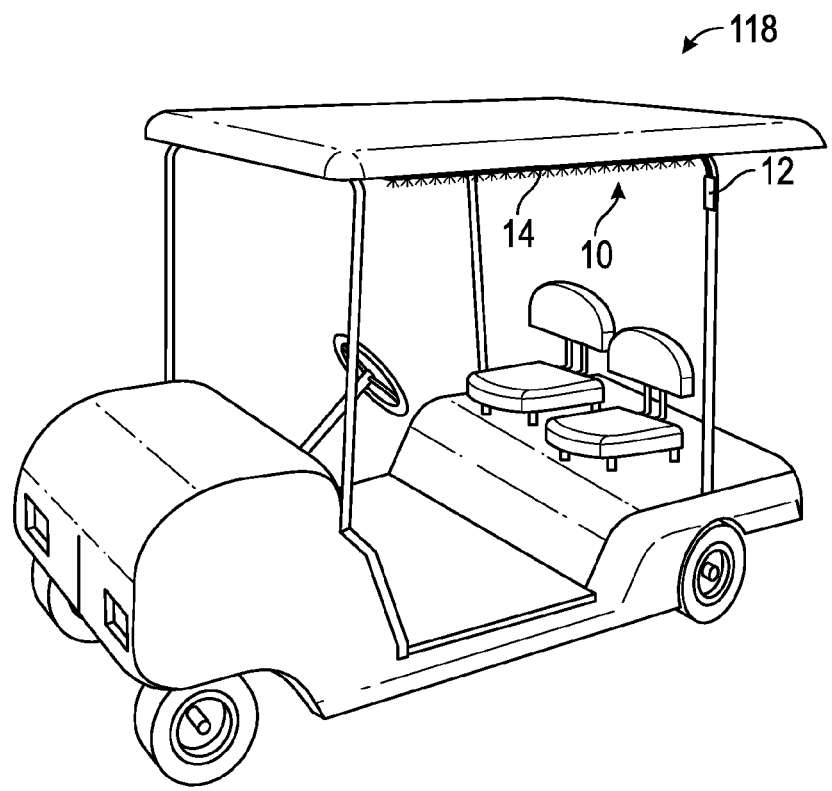
FIG. 15A is a perspective view of a golf cart incorporating a decorative lighting system along an underside of its roof.
Figure 15B:
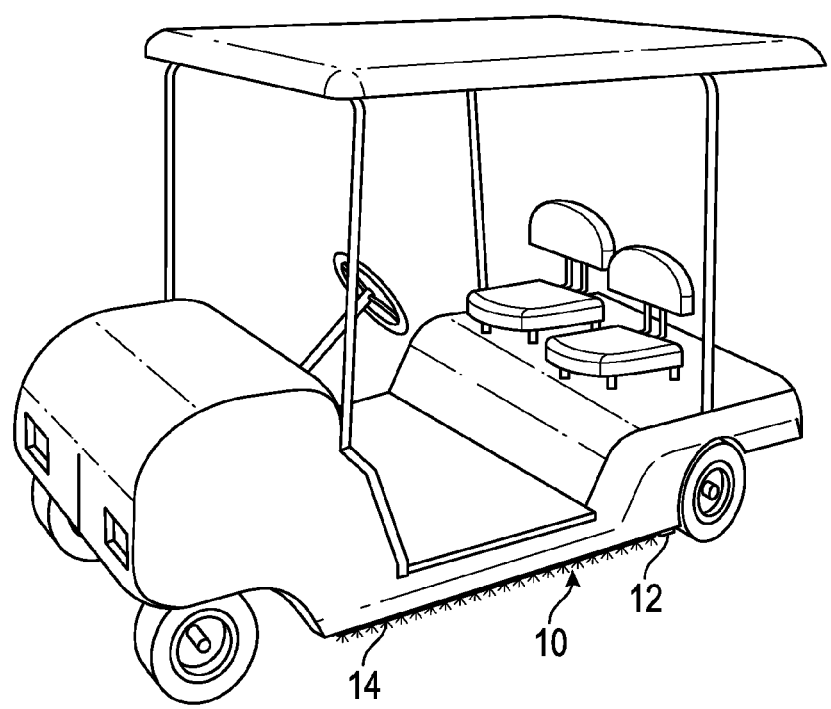
FIG. 15B is a perspective view of the golf cart incorporating a decorative lighting system along an underside of its frame or body.

Referring now to the drawings and the illustrative embodiments depicted therein, a decorative lighting system 10 (FIGS. 1-7 and 13-15B) is attachable to substantially any article of sporting equipment, such as a snowboard 102 (FIGS. 1 and 2), snow skis 104 (FIG. 3), snowshoes 106 (FIG. 4), bicycles 108a, 108b (FIGS. 5A and 5B), skateboards 112 (FIGS. 6 and 8), watercraft such as kayaks 114 (FIG. 13) and stand-up paddleboards 116 (FIG. 14), and even powered vehicles such as golf carts 118 (FIGS. 15A and 15B) and the like. It will be appreciated that, optionally, lighting system 10 may be incorporated into other sporting equipment that may be desirable for use in low-light or nighttime conditions, such as flying discs, racquets, kites, fishing equipment such as downriggers 38 (FIG. 12), and the like.

Figure 7:
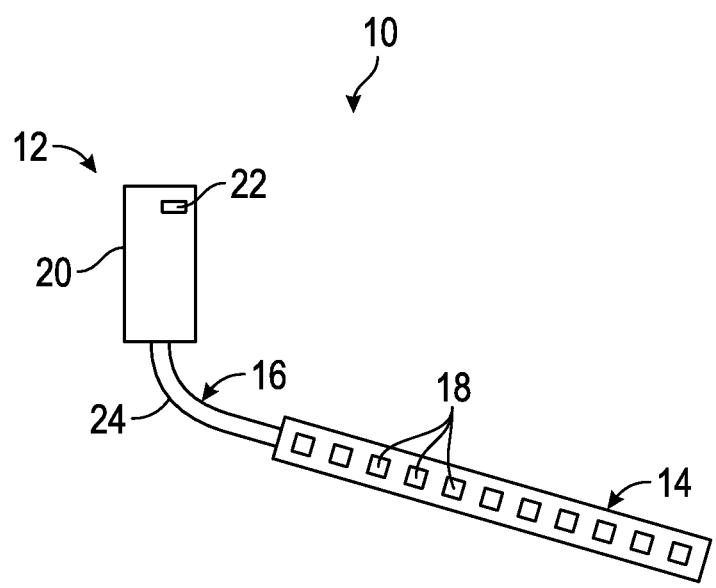
FIG. 7 is a plan view of the decorative lighting system in accordance with the present invention.

Lighting system 10 includes an electrical power source 12, a lighting strip or ribbon 14, and electrical wiring 16 for communicating electricity from power source 12 to a plurality of electrical lamps 18 in lighting strip 14 (FIGS. 1-7). In the illustrated embodiment, and as best shown in FIG. 7, electrical power source 12 includes a housing or battery box 20 with an electrical switch 22 for energizing and de-energizing lamps 18 of lighting strip 14. Housing or battery box 20 may be waterproof and/or shock resistant so that impacts to the sporting equipment, or the housing or battery box itself, do not damage the power source 12, and so that environmental contaminants ranging from rain spray to dust and grit are substantially prevented from entering the housing or battery box.

Optionally, a dimmer circuit may be provided to permit a user to control the intensity of light output by lighting strip 14. It is further envisioned that a circuit could be provided to alter the light output of individual lamps, such as to provide flashing or "moving" patterns of light along strip 14, and the lamps of each strip 14 may have a specific color of light output (e.g., blue, green, white, yellow, red, orange, etc.), or each strip may include lamps of varying colors. Electrical wiring 16 may be sheathed in shrink tubing 24 or other protective material (FIG. 7), such as to enhance the durability of the wiring and its resistance to water or other debris or contaminants, and may further be sealed to housing 20 and/or to lighting strip 14. In addition, sealants or sealing materials may be applied to various portions of the lighting system 10, including any or all of electrical power source 12, lighting strip or ribbon 14, and electrical wiring 16.

Each lighting system 10 may be releasably attached to an article of sporting equipment by an attachment element, such as a curable adhesive (glue, epoxy resin, etc.), adhesive strips (e.g. double-sided tape), clips, an elongate flexible member such as a flexible strap or belt, hook-and-loop fasteners, or the like. The attachment element (as well as lighting strip 14, wiring 16, and power source 12) is preferably water-resistant, and capable of functioning in a wide range of weather conditions from sub-zero temperatures to wet snow, or high heat and/or humidity, as well as in high-vibration or high-impact operating conditions, which may be particularly common for use on skis, snowboards, and skateboards, for example. It is envisioned that the lighting system 10 may be attached to substantially any article of sporting equipment other like, and substantially without need for drilling mounting holes or making other material alterations to the equipment, such that the lighting system 10 may be installed as a retrofit kit and, optionally, may later be removed substantially without damage to the equipment.

Lighting strips 14 are preferably flexible, while lamps 18 may be low-voltage lighting such as light-emitting diode (LED) lamps or the like. For example, it has been found that "SMD 3528 Flexible LED Light Strips," available from Huake Optoelectronics (Asia) Co., Ltd. (www.ledlightsworld.com), provide satisfactory results. Such light strips may be selectable in length, such as by cutting at a predefined location or interval, to provide a desired length strip. For example, 3528 SME LED strips are available in four levels or shades (warmth) of white color, plus red, green, blue, and yellow, and can be powered by a 12V power source at 24 watts, although some light strips are operable at different voltages, such as by a standard 9V battery or the like. The strips may be mounted using adhesive tape, and utilize a printed circuit board for providing power to the lamps. The strips are substantially waterproof and the individual lamps each have a viewing angle of about 100 to 120 degrees.

Figure 1:
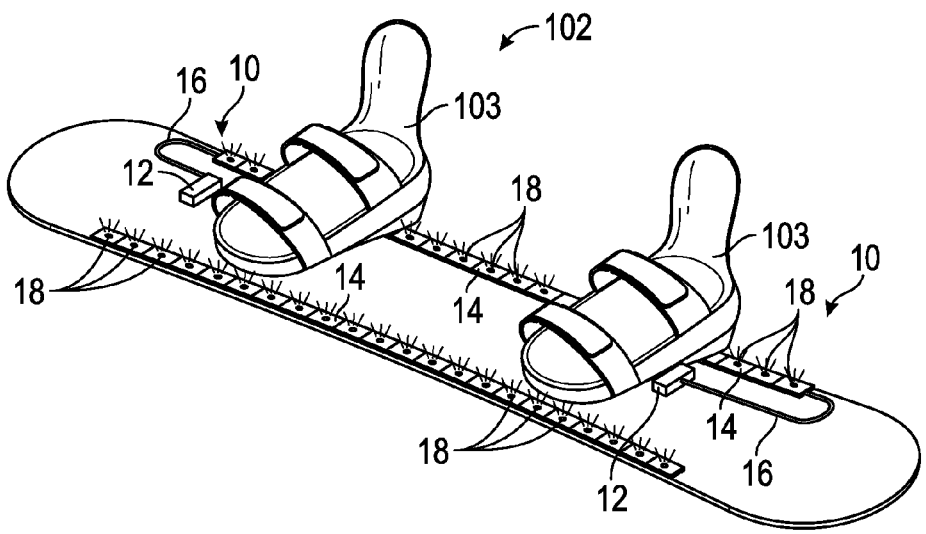
FIG. 1 is a perspective view of a snowboard incorporating a decorative lighting system in accordance with the present invention, shown in a parallel arrangement.
Figure 2:
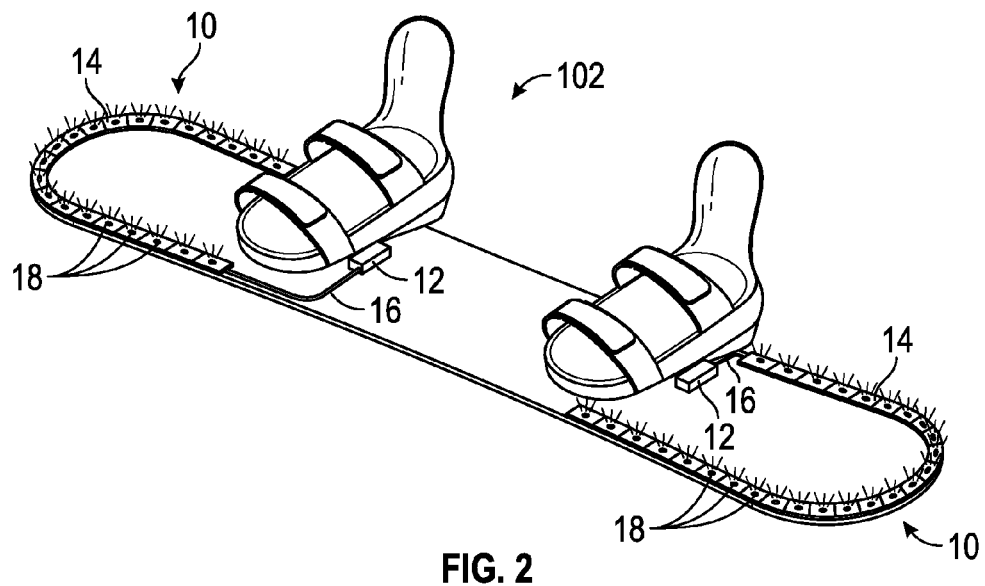
FIG. 2 is a perspective view of the snowboard incorporating the decorative lighting system in a front and rear arrangement.
Figure 3:
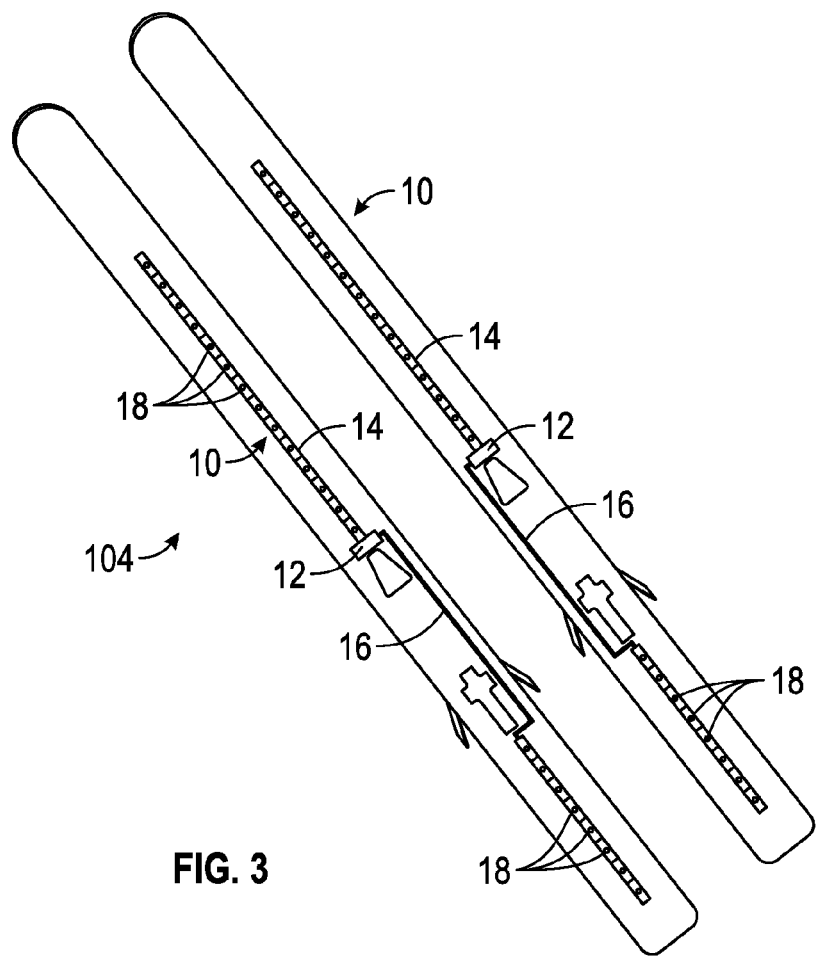
FIG. 3 is a top plan view of a pair of snow skis incorporating the decorative lighting system along forward and rearward top portions thereof.

As shown in FIG. 1, two or more light strips 14 may be arranged along a snowboard 102 or other sporting equipment, with the power source 12 and electrical wiring 16 positioned in an unobtrusive or out-of-the way location, such as adjacent a boot binding 103. The light strips 14 may be curved (FIGS. 2 and 4) and arranged substantially anywhere they are desired, and without interfering with the operation of the sporting equipment. Optionally, and as shown in FIG. 3, a single power source 12 may be used to power two lighting strips 14 that are both electrically coupled to power source 12 via wiring 16. This arrangement enables two or more separate regions of the sporting equipment to be lit with only a single power source. Optionally, lighting system 10 may be provided as a retrofit kit for existing sporting equipment, or may be installed during manufacturing of the equipment.

Figure 8:
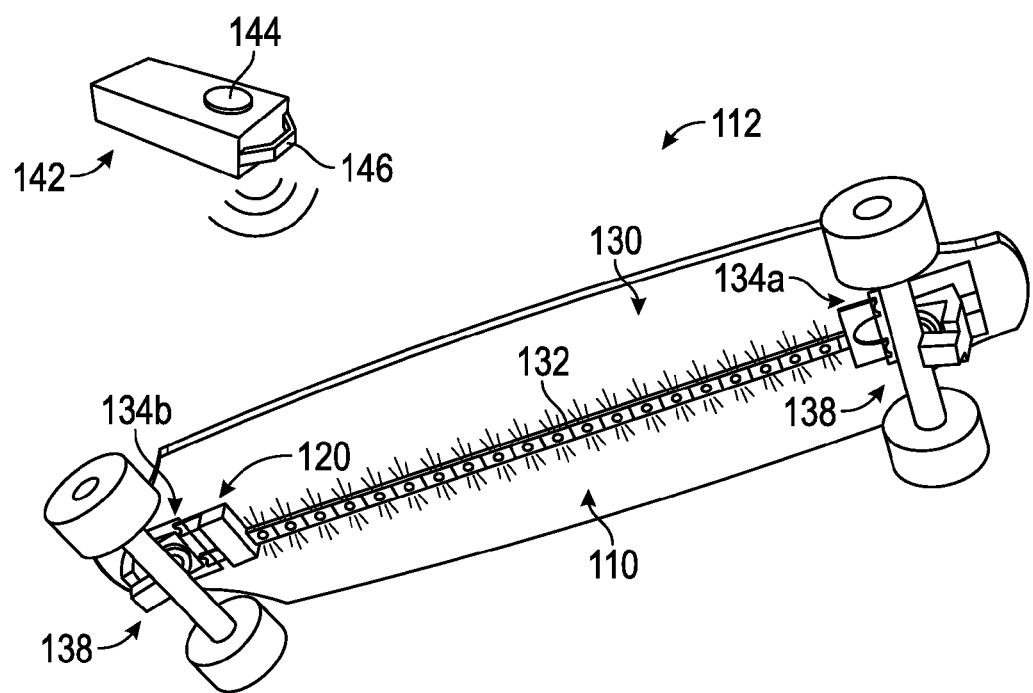
FIG. 8 is a bottom perspective view of a skateboard with another decorative lighting system in accordance with the present invention, shown in combination with a wireless remote controller.
Figure 16:
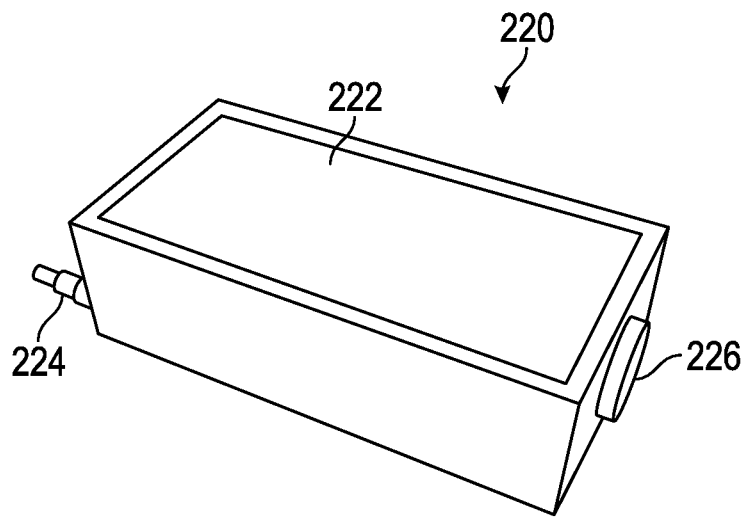
FIG. 16 is a perspective view of a battery box with switch.
Figure 17:
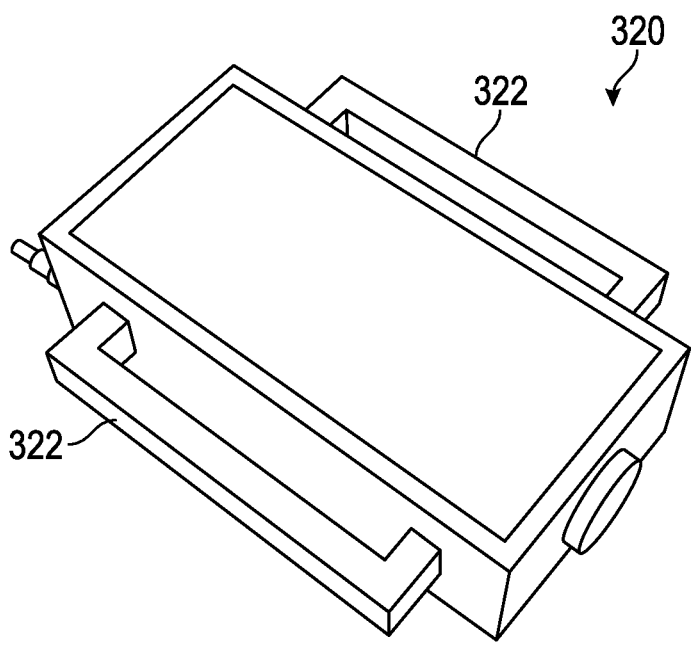
FIG. 17 is a perspective view of another battery box with switch.

It is envisioned that battery box 20 may be substantially weather-sealed, with gaskets or seals (e.g., O-rings, polygonal gaskets, etc.) provided along covers or openings so that power source 12 may be used on watercraft, or in rain or snow conditions, for example. Battery box 20 contains one or more cells 26, such as shown in FIGS. 11A and 11B, which may be replaceable in the box. Various embodiments of battery box are envisioned. For example, a battery box 120 (FIGS. 8-10) may be configured for use with a substantially self-contained lighting system 110 that mounts to the underside of a skateboard 112, such as shown in FIG. 8, and as will be described in greater detail below. Another battery box 220 (FIG. 16) has a cover 222, an opening for a lead wire that passes through a waterproof strain relief 224, and a sealed spring-loaded on/off pushbutton 226, which may have a rubber covering or the like. Another battery box 320 (FIG. 17) has a pair of attachment portions 322 in the form of loops defining openings that facilitate attachment of the battery box to a frame portion or other part of an article of sporting equipment, a vehicle, or the like, such as with a cinch-strap, hook-and-loop fastener strap, or the like. Attachment portions 322 may also be used to secure battery box 320 to a wearer's belt or a strap associated with clothing, a backpack, or the like. In the illustrated embodiment, attachment portions 322 are unitarily formed with battery box 320. Optionally, a resilient or spring-loaded belt clip may be provided along an outer surface of the battery box.

Figure 11:
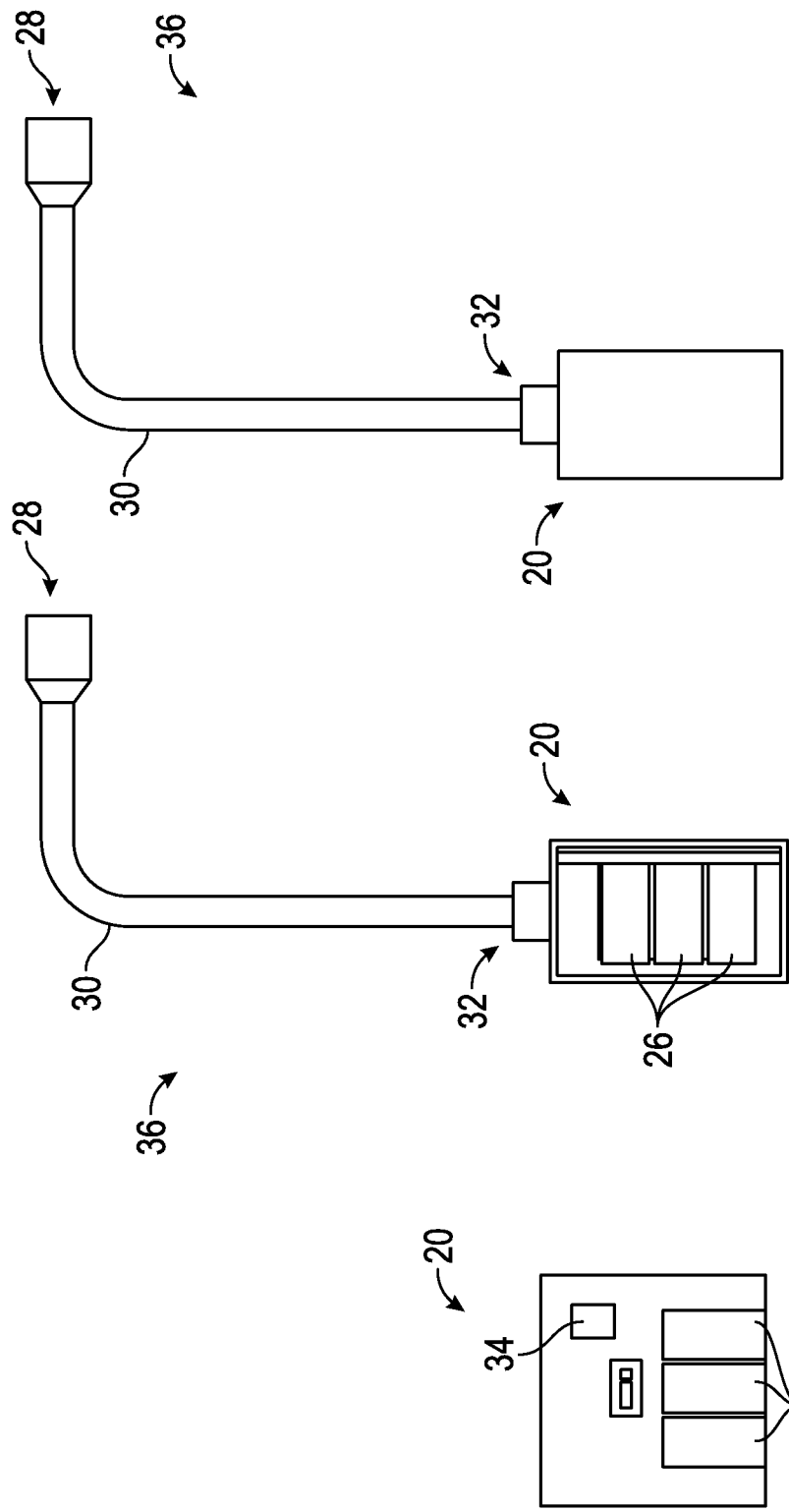
FIG. 11A is a front plan view of a water-resistant battery box of another lighting system in accordance with the present invention.
FIG. 11B is a partial-sectional side elevation of a light assembly including an electric lamp at the end of a flexible neck, connected to the battery box of FIG. 11A.
FIG. 11C is a side elevation of the light assembly of FIG. 11B.
Figure 12:
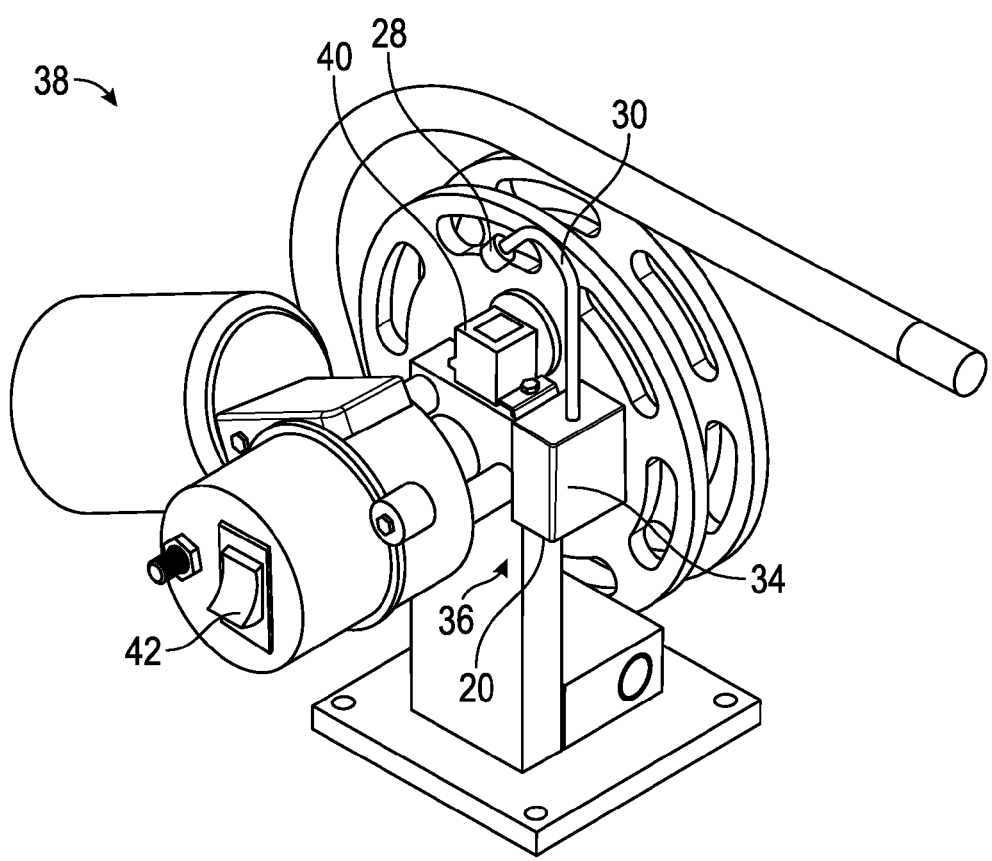
FIG. 12 is a perspective view of a fishing downrigger fitted with the light assembly of FIG. 11C.

Referring now to FIGS. 11B and 11C, battery box 20 may be fitted with an electric lamp 28 at the end of a flexible neck or conduit 30, which is attached to the box 20 via a waterproof coupling 32 that may incorporate rubber O-rings, for example. Battery box 20 may contain a circuit board having a timer that is activated by a sealed power on/off switch 34, such as shown in FIGS. 11A and 12. The timer is started when the on/off switch 34 is actuated, at which point the lamp 28 (which may be an LED or incandescent lamp, for example) is energized and illuminated until a predetermined amount of time has lapsed since the switch was actuated, at which point the circuit board will de-energize the lamp 28. Optionally, the circuit board gradually dims the lamp 28 prior to fully de-energizing it. Battery box 20, electric lamp 28, and flexible neck 30 form a lamp assembly 36, which can be secured to sporting equipment such as fishing downriggers 38 (FIG. 12) via straps, fasteners, or waterproof adhesive, for example. Flexible neck 30 allows light from lamp 28 to be directed in different directions to illuminate desired areas of the downrigger 38, such as a depth counter 40 or a control switch 42, for example.

Figure 9:
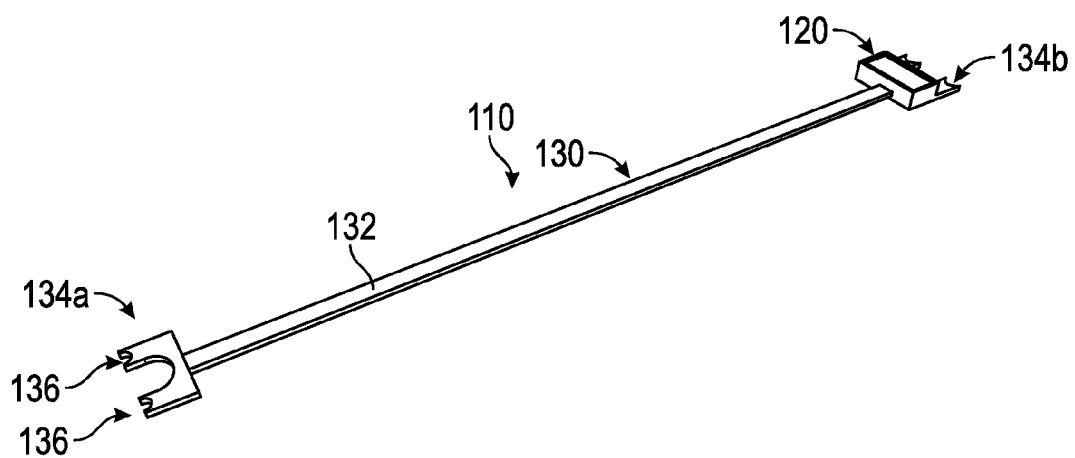
FIG. 9 is a perspective view of the decorative lighting system of FIG. 8.
Figure 10:
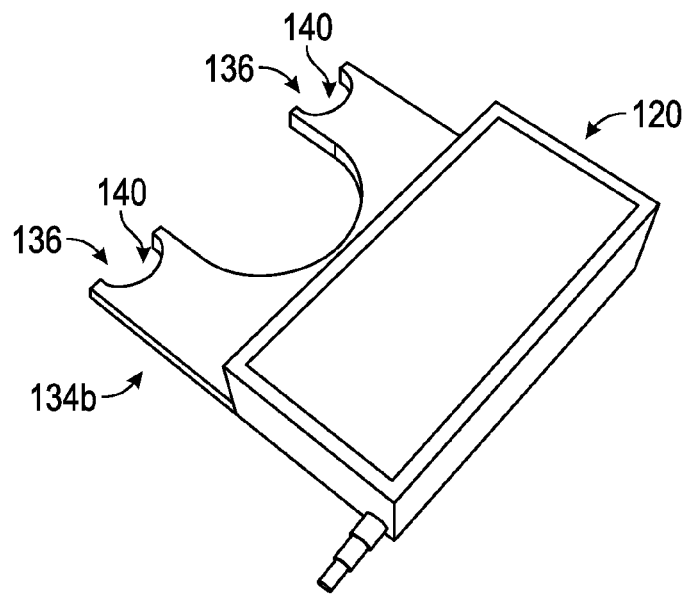
FIG. 10 is an enlarged perspective view of a battery box portion of the lighting system of FIGS. 8 and 9.

Optionally, and with reference to FIGS. 8-10, lighting system mount 130 may be used to secure the lighting system 110 to a particular article of sporting equipment, such as the skateboard 112 shown in FIG. 8. In the illustrated embodiment, lighting system mount 130 includes a generally U-shaped elongate channel 132 extending along a substantial portion of the length of the skateboard. In the illustrated embodiment, channel 132 is transparent, or at least translucent, and houses lighting strip 14 to protect the lighting strip and allow emitted light to illuminate the area surrounding the skateboard. Channel 132 may be made from an impact-resistant extruded resinous plastic, for example, and may allow for at least a 120° viewing angle. Channel 132 extends between a pair of bracket portions 134a, 134b that are both generally U-shaped, with mounting portions 136 (FIG. 9) that are configured to be secured to skateboard 112 at its wheel trucks 138, such as via threaded fasteners that also secure the trucks 138 to the board. As best shown in FIG. 10, one of the mounting portions 136 may be part of (and/or may extend from) battery box 120, which supplies power to lighting strip 14 housed within channel 132. Mounting portions 136 may be captured and secured between wheel trucks 138 and the underside of the board as the wheel trucks 138 are tightened to the board. Openings or recesses 140 formed in the mounting portions 136 (FIG. 10) may receive threaded bolts, for example. However, it is envisioned that the lighting system mount 130 could be attached to the skateboard in other ways, such as with adhesives, hook-and-loop fasteners, snaps, magnets, or the like.

Optionally, a wireless hand-held remote control 142 (FIG. 8) may be used to activate lighting system 110 such as by communicating with a circuit board contained within battery box 120. The remote control 142 may be operable using substantially any wireless signal transmission protocol, and can be used to switch lighting system 110 on and off as desired. Optionally, lighting system 110 may utilize a circuit board that permits several different operating modes, such as variable brightness, flashing, sequencing, changing colors, etc. It is envisioned that the various operating modes of the system may be selected using the remote control 142, such as by repeatedly pressing an on/off or mode-select button 144 on the remote control 142 until the desired operating mode is reached. An optional attachment portion 146 facilitates attachment of remote control 142 to an article of clothing such as a belt, or to a strap, keychain, belt loop, or the like, so that a user can keep remote control 142 in a readily accessible location. In the illustrated embodiment, attachment portion 146 is unitarily formed with a housing of remote control 142.

It will be appreciated that substantially any lighting system of the present invention may be configured to receive control signals via a remote wireless controller, or even a wired remote controller, so that the lighting system may be controlled without directly accessing the battery box or other on-board controller, which may be hidden from view or at least may not be located in an easily-accessible location.

Therefore, the present invention provides a decorative lighting system that enhances the visibility and visual appeal of sporting equipment, particularly in low-light or dark conditions. The system may also provide sufficient light to illuminate the immediately surrounding area, such as to aid a user of the equipment in seeing the immediate area in darkness. The system is preferably waterproof or water resistant and shock proof or shock resistant, so that it is suitable for use in the outdoors where impacts are to be expected, plus contaminants such as water, dust, sand, oil, or the like may be common.

Changes and modifications to the specifically-described embodiments may be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A decorative lighting system for sporting equipment, said lighting system comprising:
   a lighting strip having a plurality of electrical lamps arranged substantially in-line with one another;
   a first adhesive member for securing said lighting strip to a surface of the sporting equipment;
   a self-contained electrical power source for providing electrical current to said electrical lamps of said lighting strip, said electrical power source including a weather-sealed housing and a weather-sealed control switch at said housing, wherein said housing is configured for attachment to an external surface of the sporting equipment;
   electrical wiring in communication with said lighting strip and said electrical power source;
   a protective weather-resistant sheath disposed around said electrical wiring, wherein said sheath comprises an end portion sealed to said housing and an opposite end portion sealed to said lighting strip; and
   a second adhesive member for securing said electrical power source to an article of sporting equipment.

2. The lighting system of claim 1, wherein said electrical lighting strip comprises a flexible strip.

3. The lighting system of claim 2, wherein said electrical lamps comprise light-emitting diodes.

4. The lighting system of claim 3, wherein said light-emitting diodes are configured to emit light in a plurality of different colors.

5. The lighting system of claim 1, wherein said first adhesive member comprises double-sided tape.

6. The lighting system of claim 1, wherein said first and second adhesive members are configured to releasably secure said lighting strip and said electrical power source to the article of sporting equipment.

7. The lighting system of claim 1, wherein said electrical power source comprises a battery disposed in said housing.

8. The lighting system of claim 1, wherein one of said electrical power source and said electrical wiring comprises an electrical switch for selectively energizing said electrical lamps.

9. The lighting system of claim 8, further comprising a wireless transmitter, wherein said electrical switch is remotely actuatable via said wireless transmitter.

10. The lighting system of claim 1, wherein said housing comprises a main housing body and a loop portion extending outwardly from said main housing body and defining an opening, wherein said loop portion is configured to facilitate securing said housing to the sporting equipment or to an article of clothing of a user of the sporting equipment.

11. The lighting system of claim 10, further comprising an elongate flexible member that is configured to engage said loop portion at said opening.

12. The lighting system of claim 1, further in combination with the article of sporting equipment.

13. The lighting system of claim 12, wherein said article of sporting equipment comprises one chosen from (i) a snowboard, (ii) a snow ski, (iii) a snowshoe, (iv) a skateboard, (v) a bicycle, (vi) a surfboard, (vii) a standup paddleboard, (viii) a kayak, and (ix) a powered vehicle.

14. The lighting system of claim 13, wherein said article of sporting equipment comprises a snowboard, and wherein a pair of said lighting strips are arranged along opposite edge portions of said snowboard, or along opposite end portions of said snowboard.

15. The lighting system of 13, wherein said article of sporting equipment comprises a skateboard, wherein said skateboard comprises front and rear wheel trucks along a bottom surface thereof, and wherein said lighting strip is secured along said bottom surface and aligned parallel to the longitudinal axis of the skateboard directly between said front and rear wheel trucks.

16. The lighting system of claim 15, further comprising:
    an elongate channel extending between said front and rear wheel trucks of said skateboard, said elongate channel comprising a translucent material and having opposite end portions, wherein said lighting strip is disposed in said elongate channel;
    a pair of brackets, each disposed at a respective one of said opposite end portions of said elongate channel, and each of said brackets comprising a respective mounting portion configured to enable securement of said decorative lighting system to the skateboard via a fastener associated with the skateboard; and
    wherein said electrical power source is mounted at one of said brackets.

17. The lighting system of claim 16, wherein said housing of said electrical power source is unitarily formed with said one of said brackets.

18. A decorative lighting system for a skateboard, said lighting system comprising:
    an elongate channel configured to extend between front and rear wheel trucks of the skateboard and along a longitudinal axis of the skateboard, said elongate channel comprising a translucent material and having front and rear end portions opposite one another;
    a lighting strip having a plurality of electrical lamps arranged substantially in-line with one another and disposed in said elongate channel;
    front and rear bracket portions disposed at respective ones of said front and rear end portions of said elongate channel, wherein said bracket portions are generally U-shaped including a pair of spaced-apart mounting portions configured to be engaged by a respective one of the wheel trucks or by respective threaded mounting bolts associated therewith;
    an electrical power source for providing electrical current to said electrical lamps of said lighting strip, said electrical power source comprising a weather-resistant housing at one of said front and rear bracket portions; and
    electrical wiring in weather-resistant communication with said lighting strip and said electrical power source.

19. The lighting system of claim 18, wherein said weather-resistant housing of said electrical power source comprises one of said front and rear bracket portions, and wherein said spaced-apart mounting portions each define a recess or opening configured to receive the respective threaded mounting bolts of the wheel trucks.

20. The lighting system of claim 18, further comprising a wireless hand-held transmitter in communication with said electrical power source and operable to selectively energize said electrical lamps.

\* \* \* \* \*